US012679968B2

(12) United States Patent
Choe et al.

(10) Patent No.: US 12,679,968 B2
(45) Date of Patent: Jul. 14, 2026

(54) THERMOPLASTIC RESIN COMPOSITION

(71) Applicant: LG CHEM, LTD., Seoul (KR)

(72) Inventors: Jun Ho Choe, Daejeon (KR); Ho Namgung, Daejeon (KR); Seong Lyong Kim, Daejeon (KR); Dae San Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 592 days.

(21) Appl. No.: 18/273,484

(22) PCT Filed: Sep. 14, 2022

(86) PCT No.: PCT/KR2022/013711
§ 371 (c)(1),
(2) Date: Jul. 20, 2023

(87) PCT Pub. No.: WO2023/043181
PCT Pub. Date: Mar. 23, 2023

(65) Prior Publication Data

US 2024/0132713 A1 Apr. 25, 2024

(30) Foreign Application Priority Data

Sep. 16, 2021 (KR) ........................ 10-2021-0123939
Sep. 13, 2022 (KR) ........................ 10-2022-0115074

(51) Int. Cl.
*C08L 23/06* (2006.01)
*C08F 212/10* (2006.01)
*C08F 220/32* (2006.01)
*C08L 55/02* (2006.01)

(52) U.S. Cl.
CPC ............ *C08L 55/02* (2013.01); *C08F 212/10* (2013.01); *C08F 220/325* (2020.02); *C08L 23/06* (2013.01); *C08L 2203/30* (2013.01); *C08L 2205/025* (2013.01); *C08L 2205/035* (2013.01); *C08L 2207/20* (2013.01)

(58) Field of Classification Search
CPC ...... C08L 55/02; C08L 23/06; C08L 2203/30; C08L 2205/025; C08L 2205/035; C08L 2207/20; C08L 2205/03; C08L 25/12; C08F 212/10; C08F 220/325; C08F 279/04
See application file for complete search history.

(56) References Cited

U.S. PATENT DOCUMENTS

2016/0122536 A1 5/2016 Sohn et al.
2020/0369864 A1 11/2020 Ryoo et al.
2021/0115244 A1 4/2021 Niessner et al.
2022/0177688 A1 6/2022 Choe et al.
2022/0259421 A1 8/2022 Lee et al.

FOREIGN PATENT DOCUMENTS

| | | | | | |
|---|---|---|---|---|---|
| CN | 105566877 | A | | 5/2016 | |
| CN | 106046589 | A | | 10/2016 | |
| CN | 111356741 | A | | 6/2020 | |
| JP | H08-311251 | A | | 11/1996 | |
| JP | 2007161956 | A | * | 6/2007 | |
| JP | 6671175 | B2 | | 3/2020 | |
| KR | 10-1996-0005073 | B1 | | 4/1996 | |
| KR | 20000039845 | A | | 7/2000 | |
| KR | 10-0574453 | B1 | | 4/2006 | |
| KR | 101150016 | B1 | * | 6/2012 | ................ C08F 2/02 |
| KR | 10-2013-0075793 | A | | 7/2013 | |
| KR | 101974164 | B1 | | 4/2019 | |
| KR | 10-2020-0036594 | A | | 4/2020 | |
| KR | 10-2020-0126917 | A | | 11/2020 | |
| KR | 10-2021-0014323 | A | | 2/2021 | |
| KR | 10-2021-0048404 | A | | 5/2021 | |
| KR | 10-2256539 | B1 | | 5/2021 | |
| WO | WO-2020067681 | A1 | * | 4/2020 | .............. C08L 25/12 |

OTHER PUBLICATIONS

International Search Report (with partial translation) and Written Opinion dated Dec. 15, 2022, for corresponding International Patent Application No. PCT/KR2022/013711.
Extended European Search Report issued Jul. 9, 2024 in corresponding European patent application 22870265.
Office Action dated Nov. 29, 2025 issued in the corresponding Chinese Patent Application No. 202280009659.6.

* cited by examiner

*Primary Examiner* — Kumar R Bhushan
(74) *Attorney, Agent, or Firm* — Morgan, Lewis & Bockius LLP

(57) ABSTRACT

The present invention relates to a thermoplastic resin composition including a diene-based graft polymer; a first polymer including a vinyl cyanide-based monomer and an alkyl-substituted styrene-based monomer; a second polymer including a vinyl cyanide-based monomer, an aromatic vinyl-based monomer, and a (meth)acrylate-based monomer; a third polymer including a vinyl cyanide-based monomer and an alkyl-unsubstituted styrene-based monomer and having a weight-average molecular weight of 80,000 to 220,000 g/mol; a fourth polymer including a vinyl cyanide-based monomer and an alkyl-unsubstituted styrene-based monomer and having a weight-average molecular weight of 1,500,000 to 5,000,000 g/mol; and a fifth polymer including an olefin-based monomer and having a density of 970 to 1,000 kg/$m^3$ measured in accordance with ASTM D1505, wherein the fifth polymer is included in 0.10 to 3.00 parts by weight with respect to 100 parts of the diene-based graft polymer, the first polymer, the second polymer, the third polymer, and the fourth polymer.

12 Claims, No Drawings

THERMOPLASTIC RESIN COMPOSITION

CROSS-REFERENCE TO RELATED APPLICATION

This application is a U.S. National Stage under 35 U.S.C. § 371 of international application No. PCT/KR2022/013711, filed Sep. 14, 2022, which claims priority to and the benefit of Korean Patent Application No. 10-2021-0123939, filed on Sep. 16, 2021, and Korean Patent Application No. 10-2022-0115074, filed on Sep. 13, 2022, the disclosures of which are incorporated herein by reference in their entireties.

TECHNICAL FIELD

The present invention relates to a thermoplastic resin composition, and specifically, a thermoplastic resin composition whose moldability and recyclability are excellent.

BACKGROUND ART

Since spoilers are very large and are used for automobiles, the spoilers are generally produced by extrusion blow molding using thermoplastic resin compositions comprising diene-based graft polymers. When the spoilers are manufactured by extrusion blow molding, a defect rate is less than 3%, so there is an advantage of excellent manufacturing efficiency compared to injection molding whose defect rate is 10%.

However, despite the low defect rate, there are many difficulties in developing a suitable thermoplastic resin composition in terms of the specificity of the extrusion blow molding process, specifically, a parison weight needs to be 6 kg or more, a crushed material needs to be used at 60% or more to reduce costs, quality needs to be not degraded even when the crushed material is recycled at least 5 times, and sanding and coating processes need to be performed. Therefore, it is very important to develop a thermoplastic resin composition which has high melt strength and excellent recyclability and is suitable for sanding and coating processes.

Meanwhile, a method of using a high-molecular-weight polymer and a branched polymer as components of a thermoplastic resin composition has been proposed to increase melt strength, but there are problems such as the occurrence of a melt fracture phenomenon and degradation of surface characteristics. Also, since deterioration of a thermoplastic resin composition needs to be minimized to improve the recyclability of a thermoplastic resin composition, and a thermoplastic resin composition needs to be extruded at a relatively low temperature to minimize deterioration, there is a problem such as a reduction in thermoplastic resin composition productivity.

Therefore, it is very important to develop a thermoplastic resin composition which is capable of maintaining productivity while improving the moldability and surface characteristics of a spoiler.

RELATED-ART DOCUMENTS

Patent Documents (Patent Document 1) KR0574453B

DISCLOSURE

Technical Problem

The present invention is directed to providing a thermoplastic resin composition whose moldability is excellent due to having high melt strength and whose surface characteristics and recyclability are enhanced.

Technical Solution

1) One aspect of the present invention provides a thermoplastic resin composition which comprises: a diene-based graft polymer; a first polymer comprising a vinyl cyanide-based monomer unit and an alkyl-substituted styrene-based monomer unit; a second polymer comprising a vinyl cyanide-based monomer unit, an aromatic vinyl-based monomer unit, and a (meth)acrylate-based monomer unit represented by Chemical Formula 1 below; a third polymer comprising a vinyl cyanide-based monomer unit and an alkyl-unsubstituted styrene-based monomer unit and having a weight-average molecular weight of 80,000 to 220,000 g/mol; a fourth polymer comprising a vinyl cyanide-based monomer unit and an alkyl-unsubstituted styrene-based monomer unit and having a weight-average molecular weight of 1,500,000 to 5,000,000 g/mol; and a fifth polymer comprising an olefin-based monomer unit and having a density of 970 to 1,000 kg/m$^3$ measured in accordance with ASTM D1505, wherein the fifth polymer is comprised in an amount of 0.10 to 3.00 parts by weight with respect to 100 parts by weight of the sum of the diene-based graft polymer, the first polymer, the second polymer, the third polymer, and fourth polymer:

<Chemical Formula 1>

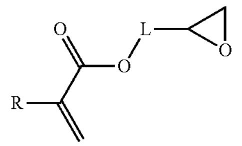

in Chemical Formula 1,

R represents hydrogen or a $C_1$ to $C_{10}$ alkyl group,

L represents a $C_1$ to $C_{10}$ alkylene group.

2) According to 1), the present invention provides a thermoplastic resin composition in which the fifth polymer has a weight-average molecular weight of 500 to 5,500 g/mol.

3) According to 1) or 2), the present invention provides a thermoplastic resin composition in which the fifth polymer has a softening point of 130 to 140° C. measured in accordance with ASTM D1525.

4) According to any one of 1) to 3), the present invention provides a thermoplastic resin composition in which the diene-based graft polymer comprises a diene-based rubber polymer to which an aromatic vinyl-based monomer unit and a vinyl cyanide-based monomer unit are grafted.

5) According to any one of 1) to 4), the present invention provides a thermoplastic resin composition in which the diene-based graft polymer is comprised in an amount of 23.00 to 43.00 parts by weight with respect to 100 parts by weight of the sum of the diene-based graft polymer, the first polymer, the second polymer, the third polymer, and the fourth polymer.

6) According to any one of 1) to 5), the present invention provides a thermoplastic resin composition in which the first polymer comprises an alkyl-unsubstituted styrene-based monomer unit.

7) According to 6), the present invention provides a thermoplastic resin composition in which the first polymer is an acrylonitrile/styrene/α-methyl styrene polymer.

8) According to any one of 1) to 7), the present invention provides a thermoplastic resin composition in which the first polymer is comprised in an amount of 36.00 to 56.00 parts by weight with respect to 100 parts by weight of the sum of the diene-based graft polymer, the first polymer, the second polymer, the third polymer, and the fourth polymer.

9) According to any one of 1) to 8), the present invention provides a thermoplastic resin composition in which the second polymer is an acrylonitrile/styrene/glycidyl methacrylate polymer.

10) According to any one of 1) to 9), the present invention provides a thermoplastic resin composition in which the second polymer is comprised in an amount of 0.05 to 7.00 parts by weight with respect to 100 parts by weight of the sum of the diene-based graft polymer, the first polymer, the second polymer, the third polymer, and the fourth polymer.

11) According to any one of 1) to 10), the present invention provides a thermoplastic resin composition in which the third polymer is comprised in an amount of 9.00 to 29.00 parts by weight with respect to 100 parts by weight of the sum of the diene-based graft polymer, the first polymer, the second polymer, the third polymer, and the fourth polymer.

12) According to any one of 1) to 11), the present invention provides a thermoplastic resin composition in which the fourth polymer is comprised in an amount of 0.10 to 9.00 parts by weight with respect to 100 parts by weight of the sum of the diene-based graft polymer, the first polymer, the second polymer, the third polymer, and the fourth polymer.

Advantageous Effects

A thermoplastic resin composition according to the present invention exhibits excellent moldability due to having high melt strength, and the surface characteristics and recyclability thereof are excellent.

MODES OF THE INVENTION

Hereinafter, the present invention will be described in further detail to aid in understanding the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present invention, a "diene-based rubber polymer" is prepared by polymerizing diene-based monomers, and the diene-based monomer may be one or more selected from the group consisting of 1,3-butadiene, isoprene, chloroprene, and piperylene, with 1,3-butadiene being preferred.

In the present invention, an "alkyl-unsubstituted styrene-based monomer" may be one or more selected from the group consisting of styrene, 4-fluorostyrene, 4-chlorostyrene, 2-chlorostyrene, 4-bromostyrene, and 2-bromostyrene, with styrene having excellent moldability being preferred. Also, a unit derived from an "alkyl-unsubstituted styrene-based monomer" is an "alkyl-unsubstituted styrene-based monomer unit."

In the present invention, an "alkyl-substituted styrene-based monomer" may be one or more selected from the group consisting of α-methyl styrene, p-methyl styrene, and 2,4-dimethyl styrene, with α-methyl styrene having excellent heat resistance being preferred. Also, a unit derived from an "alkyl-substituted styrene-based monomer" is an "alkyl-substituted styrene-based monomer unit."

In the present invention, a "vinyl cyanide-based monomer" may refer to one or more selected from the group consisting of acrylonitrile, 2-methyl acrylonitrile, 2-ethyl acrylonitrile, and 2-chloro acrylonitrile. Among those listed above, acrylonitrile effective for improving chemical resistance is preferred.

Also, a unit derived from a "vinyl cyanide-based monomer" may be a "vinyl cyanide-based monomer unit."

In the present invention, an "olefin-based monomer" may be one or more selected from the group consisting of ethylene, propylene, and butene. A unit derived from an olefin-based monomer may be an olefin-based monomer unit.

In the present invention, a "$C_1$ to $C_{10}$ alkyl group" may be one or more selected from the group consisting of a methyl group, an ethyl group, a propyl group, an n-propyl group, an isopropyl group, a butyl group, an n-butyl group, an isobutyl group, a tert-butyl group, a sec-butyl group, a 1-methylbutyl group, a 1-ethyl-butyl group, a pentyl group, an n-pentyl group, an isopentyl group, a neopentyl group, a tert-pentyl group, a hexyl group, an n-hexyl group, a 1-methylpentyl group, a 2-methylpentyl group, a 4-methyl-2-pentyl group, a 3,3-dimethylbutyl group, a 2-ethylbutyl group, a heptyl group, an n-heptyl group, a 1-methylhexyl group, a cyclopentylmethyl group, a cyclohexylmethyl group, an octyl group, an n-octyl group, a tert-octyl group, a 1-methylheptyl group, a 2-ethylhexyl group, a 2-propylpentyl group, an n-nonyl group, a 2,2-dimethylheptyl group, a 1-ethyl-propyl group, a 1,1-dimethyl-propyl group, an isohexyl group, a 2-methylpentyl group, a 4-methylhexyl group, and a 5-methylhexyl group.

In the present invention, a "$C_1$ to $C_{10}$ alkylene group" may refer to a $C_1$ to $C_{10}$ alkyl group having two binding sites (i.e., a divalent group).

In the present invention, the "average particle diameter of a diene-based rubber polymer" may be measured by a dynamic light scattering method, specifically, by using Nicomp 380 HPL (commercially available from Nicomp). In this specification, an average particle diameter may refer to an arithmetic average particle diameter in the particle size distribution as measured by a dynamic light scattering method, that is, an average particle diameter based on a scattering intensity distribution.

In the present invention, the weight-average molecular weight of third to fifth polymers may be measured as a relative value with respect to a standard polystyrene sample by gel permeation chromatography (PL GPC220 commercially available from Agilent Technologies) using tetrahydrofuran as an eluent.

Thermoplastic Resin Composition

A thermoplastic resin composition according to an embodiment of the present invention comprises: 1) a diene-based graft polymer; 2) a first polymer comprising a vinyl cyanide-based monomer unit and an alkyl-substituted styrene-based monomer unit; 3) a second polymer comprising a vinyl cyanide-based monomer unit, an aromatic vinyl-based monomer unit, and a (meth)acrylate-based monomer unit represented by Chemical Formula 1 below; 4) a third polymer comprising a vinyl cyanide-based monomer unit and an alkyl-unsubstituted styrene-based monomer unit and having a weight-average molecular weight of 80,000 to 220,000 g/mol; 5) a fourth polymer comprising a vinyl cyanide-based monomer unit and an alkyl-unsubstituted styrene-based monomer unit and having a weight-average molecular weight of 1,500,000 to 5,000,000 g/mol; and 6) a fifth polymer comprising an olefin-based monomer unit and having a density of 970 to 1,000 kg/$m^3$ measured in accordance with ASTM D1505, wherein the fifth polymer is comprised in an amount of 0.10 to 3.00 parts by weight with respect to 100 parts by weight of the sum of the diene-based graft polymer, the first polymer, the second polymer, the third polymer, and the fourth polymer.

<Chemical Formula 1>

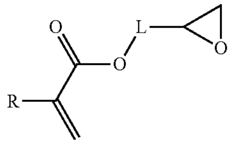

In Chemical Formula 1,

R represents hydrogen or a $C_1$ to $C_{10}$ alkyl group,

L represents a $C_1$ to $C_{10}$ alkylene group.

Hereinafter, components of the thermoplastic resin composition according to an embodiment of the present invention will be described in detail.

1) Diene-Based Graft Polymer

The diene-based graft polymer is a component that improves the impact resistance of the thermoplastic resin composition. The diene-based graft polymer may comprise a diene-based rubber polymer to which an aromatic vinyl-based monomer unit and a vinyl cyanide-based monomer unit are grafted and also comprise an aromatic vinyl-based monomer unit and a vinyl cyanide-based monomer unit which are not grafted to a diene-based rubber polymer.

The diene-based rubber polymer may have an average particle diameter of 200 to 400 nm, preferably, 250 to 350 nm. When the above-described range is satisfied, room-temperature and low-temperature impact resistance can be improved.

The diene-based rubber polymer may be comprised in an amount of 50 to 70 wt %, preferably, 55 to 65 wt % in the diene-based graft polymer. When the above-described condition is satisfied, a diene-based graft polymer having excellent room-temperature and low-temperature impact resistance can be prepared.

The aromatic vinyl-based monomer unit may be comprised in an amount of 20 to 40 wt %, preferably, 25 to 35 wt % in the diene-based graft polymer. When the above-described condition is satisfied, a diene-based graft polymer having excellent moldability can be prepared.

The vinyl cyanide-based monomer unit may be comprised in an amount of 1 to 20 wt %, preferably, 5 to 15 wt % in the diene-based graft polymer. When the above-described condition is satisfied, a diene-based graft polymer having excellent chemical resistance can be prepared.

The diene-based graft polymer may be an acrylonitrile/butadiene/styrene graft polymer comprising a butadiene rubber polymer to which an acrylonitrile unit and a styrene unit are grafted.

The diene-based graft polymer may be comprised in an amount of 23.00 to 43.00 parts by weight, preferably, 28.00 to 38.00 parts by weight with respect to 100 parts by weight of the sum of the diene-based graft polymer, the first polymer, the second polymer, the third polymer, and the fourth polymer. When the above-described condition is satisfied, the impact resistance of the thermoplastic resin composition can be improved.

2) First Polymer

The first polymer is a component that improves the heat resistance of the thermoplastic resin composition and is a non-grafted polymer. The first polymer comprises a vinyl cyanide-based monomer unit and an alkyl-substituted styrene-based monomer unit.

The first polymer may comprise 10 to 40 wt % of the vinyl cyanide-based monomer unit and 60 to 90 wt % of the alkyl-substituted styrene-based monomer unit, and it is preferable that the first polymer comprises 15 to 35 wt % of the vinyl cyanide-based monomer unit and 65 to 85 wt % of the alkyl-substituted styrene-based monomer unit. When the above-described condition is satisfied, a first polymer whose heat resistance is excellent and whose moldability, impact resistance, and chemical resistance are not degraded can be prepared. Also, the first polymer can be prevented from being phase-separated from the thermoplastic resin composition.

The first polymer may further comprise an alkyl-unsubstituted styrene-based monomer unit to realize excellent moldability. In this case, the alkyl-unsubstituted styrene-based monomer unit may be comprised in an amount of 15 wt % or less, preferably, 10 wt % or less.

The first polymer may be one or more selected from the group consisting of an acrylonitrile/α-methyl styrene polymer and an acrylonitrile/styrene/α-methyl styrene polymer.

The first polymer may be comprised in an amount of 36.00 to 56.00 parts by weight, preferably, 41.00 to 51.00 parts by weight with respect to 100 parts by weight of the sum of the diene-based graft polymer, the first polymer, the second polymer, the third polymer, and the fourth polymer. When the above-described condition is satisfied, a thermoplastic resin composition having excellent heat resistance can be prepared.

3) Second Polymer

The second polymer is a non-grafted polymer comprising a vinyl cyanide-based monomer unit, an aromatic vinyl-based monomer unit, and a (meth)acrylate-based monomer unit represented by the following Chemical Formula 1:

<Chemical Formula 1>

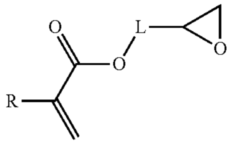

in Chemical Formula 1,

R represents hydrogen or a $C_1$ to $C_{10}$ alkyl group,

L represents a $C_1$ to $C_{10}$ alkylene group.

The second polymer may be polymerized through a double bond of the (meth)acrylate-based monomer represented by Chemical Formula 1, a double bond of the vinyl cyanide-based monomer, and a double bond of the aromatic vinyl-based monomer.

When the second polymer is comprised in a thermoplastic resin composition, the second polymer reacts with the remaining components when a thermoplastic resin composition melts, and thus a thermoplastic resin composition having a branched structure can be prepared. Also, a thermoplastic resin composition having a branched structure can realize not only high melt strength but also excellent surface characteristics.

In Chemical Formula 1, R is preferably a $C_1$ to C4 alkyl group, and L is preferably a $C_1$ to C4 alkylene group.

The second polymer may comprise 10.00 to 40.00 wt % of the vinyl cyanide-based monomer unit, 50.00 to 85.00 wt % of the aromatic vinyl-based monomer unit, and 0.05 to 10.00 wt % of the (meth)acrylate-based monomer unit represented by Chemical Formula 1, and it is preferable that the second polymer comprises 15.00 to 35.00 wt % of the vinyl cyanide-based monomer unit, 45.00 to 80.00 wt % of the aromatic vinyl-based monomer unit, and 0.05 to 10.00 wt % of the (meth)acrylate-based monomer unit represented by Chemical Formula 1. When the above-described condition is satisfied, a second polymer having excellent dispersibility, appropriate viscosity, and appropriate reactivity can be prepared. Also, the second polymer can be prevented from being phase-separated from the thermoplastic resin composition.

The second polymer may be an acrylonitrile/styrene/glycidyl methacrylate polymer.

The second polymer may be comprised in an amount of 0.05 to 7.00 parts by weight, preferably, 0.05 to 6.50 parts by weight with respect to 100 parts by weight of the sum of the diene-based graft polymer, the first polymer, the second polymer, the third polymer, and the fourth polymer. When the above-described condition is satisfied, a parison sagging phenomenon of a spoiler manufactured using the thermoplastic resin composition can be prevented from occurring, and melt fracture can be minimized.

4) Third Polymer

The third polymer is a component that improves the moldability of the thermoplastic resin composition. The third polymer is a non-grafted polymer comprising a vinyl cyanide-based monomer unit and an alkyl-unsubstituted styrene-based monomer unit.

The third polymer may have a weight-average molecular weight of 80,000 to 220,000 g/mol, preferably, 90,000 to 200,000 g/mol. When the above-described condition is satisfied, a thermoplastic resin composition whose moldability and impact resistance are excellent can be prepared. Below the above-described condition, melt strength is degraded, and above the above-described condition, viscosity is rapidly increased, and thus melt fracture occurs, leading to degradation of surface quality.

The third polymer may comprise the vinyl cyanide-based monomer unit and the alkyl-unsubstituted styrene-based monomer unit in a weight ratio of 15:85 to 35:65, preferably, 20:80 to 30:70. When the above-described range is satisfied, a third polymer whose chemical resistance and moldability are excellent can be prepared.

The third polymer may be an acrylonitrile/styrene polymer.

The third polymer may be comprised in an amount of 9.00 to 29.00 parts by weight, preferably, 14.00 to 24.00 parts by weight with respect to 100 parts by weight of the sum of the diene-based graft polymer, the first polymer, the second polymer, the third polymer, and the fourth polymer. When the above-described condition is satisfied, a thermoplastic resin composition having improved moldability can be prepared.

5) Fourth Polymer

The fourth polymer is a component that allows high melt strength to be realized by increasing the viscosity of the thermoplastic resin composition. Also, the fourth polymer may work synergistically with the second polymer to minimize the occurrence of melt fracture, which is caused by flow imbalance when the thermoplastic resin composition melts.

The fourth polymer is a non-grafted polymer comprising a vinyl cyanide-based monomer unit and an alkyl-unsubstituted styrene-based monomer unit.

The fourth polymer may have a weight-average molecular weight of 1,500,000 to 5,000,000 g/mol, preferably, 2,000,000 to 5,000,000 g/mol. When the above-described condition is satisfied, a thermoplastic resin composition having high viscosity can be prepared. Below the above-described condition, melt strength is degraded, and above the above-described condition, dispersibility is degraded.

The fourth polymer may comprise the vinyl cyanide-based monomer unit and the aromatic vinyl-based monomer unit in a weight ratio of 15:85 to 35:65, preferably, 20:80 to 30:70. When the above-described range is satisfied, a fourth polymer whose chemical resistance and moldability are excellent can be prepared.

The fourth polymer may be an acrylonitrile/styrene polymer.

The fourth polymer may be comprised in an amount of 0.10 to 9.00 parts by weight, preferably, 0.50 to 7.00 parts by weight with respect to 100 parts by weight of the sum of the diene-based graft polymer, the first polymer, the second polymer, the third polymer, and the fourth polymer. When the above-described condition is satisfied, melt fracture of a spoiler manufactured using the thermoplastic resin composition can be minimized, and even when the thermoplastic resin composition is recycled, impact resistance cannot be excessively degraded.

6) Fifth Polymer

The fifth polymer is a component that improves recyclability by reducing deterioration of the thermoplastic resin composition due to friction between thermoplastic resin compositions and friction between the thermoplastic resin composition and equipment in extrusion, processing, and recycling of the thermoplastic resin composition.

The fifth polymer is a non-grafted polymer comprising an olefin-based monomer unit and having a density of 970 to 1,000 $kg/m^3$ measured in accordance with ASTM D1505. When the density of the fifth polymer is less than the above-described range, a reduction in deterioration of the thermoplastic resin composition due to friction between thermoplastic resin compositions and friction between the thermoplastic resin composition and equipment in extrusion, processing, and recycling of the thermoplastic resin composition is not possible, and thus recyclability may not be improved. When the density of the fifth polymer exceeds the above-described range, the viscosity and surface energy of the thermoplastic resin composition are increased to increase friction between the thermoplastic resin composition and equipment, and thus surface quality is degraded.

The fifth polymer may be comprised in an amount of 0.10 to 3.00 parts by weight, preferably, 0.3 to 3 parts by weight with respect to 100 parts by weight of the sum of the diene-based graft polymer, the first polymer, the second polymer, the third polymer, and the fourth polymer. When the above-described condition is satisfied, the thermoplastic resin composition achieves high melt strength, and thus the parison sagging phenomenon of a spoiler manufactured using the thermoplastic resin composition does not occur. Also, even when the thermoplastic resin composition is recycled, impact resistance is not excessively degraded. However, below the above-described condition, when the thermoplastic resin composition is recycled, impact resistance is excessively degraded. Above the above-described condition, melt strength is degraded, and thus a parison sagging phenomenon occurs.

The fifth polymer may have a weight-average molecular weight of 500 to 5,500 g/mol, preferably, 700 to 5,000 g/mol. When the above-described condition is satisfied, the recyclability of the thermoplastic resin composition can be enhanced.

The fifth polymer may have a softening point of 130 to 140° C., preferably, 132 to 138° C. measured in accordance with ASTM D1525. When the above-described condition is satisfied, the above-described deterioration is further reduced, and thus the recyclability of the thermoplastic resin composition can be improved.

The fifth polymer may be polyethylene.

The thermoplastic resin composition according to an embodiment of the present invention may further comprise an additive such as an antioxidant and a lubricant.

Hereinafter, the present invention will be described in detail with reference to embodiments so that those skilled in the art can easily carry out the present invention. However, the present invention may be embodied in several different forms, and therefore, is not limited to embodiments described herein.

EXAMPLES AND COMPARATIVE EXAMPLES

Components used in examples and comparative examples below are as follows.

Diene-based graft polymer: DP270M commercially available from LG Chem (prepared by graft emulsion polymerization of styrene and acrylonitrile to a butadiene rubber polymer having an average particle diameter of 300 nm)

First polymer: 99UH commercially available from LG Chem (acrylonitrile/styrene/α-methyl styrene polymer)

Second polymer: SAG-005 commercially available from Fine-Blend (acrylonitrile/styrene/glycidyl methacrylate polymer)

Third polymer: 80HF commercially available from LG Chem (acrylonitrile/styrene polymer having a weight-average molecular weight of 150,000 g/mol)

Fourth polymer: ZB869 commercially available from Fine-Blend (acrylonitrile/styrene polymer having a weight-average molecular weight of 5,000,000 g/mol)

Fifth polymer: Hi-WAX 400P commercially available from Mitsui Chemicals (polyethylene having a density of 980 kg/m$^3$, a weight-average molecular weight of 4,000 g/mol, and a softening point of 136° C.)

Low-density polyethylene: Hi-WAX 420P commercially available from Mitsui Chemicals (polyethylene having a density of 930 kg/m$^3$, a weight-average molecular weight of 4,000 g/mol, and a softening point of 118° C.)

Polypropylene: Hi-WAX NP055 commercially available from Mitsui Chemicals (polypropylene having a density of 900 kg/m$^3$, a weight-average molecular weight of 700 g/mol, and a softening point of 148° C.)

Branched SAN polymer: EMI-230B commercially available from Fine-Blend (acrylonitrile/styrene polymer having a degree of branching of 5 to 7 and a polydispersity index of 4.2)

Antioxidant 1: Irganox 1010 commercially available from BASF

Antioxidant 2: ADK STAB PEP-36 commercially available from ADEKA

Lubricant 1: Ethylene bis stearamide

Lubricant 2: Calcium stearate

The above-described components were mixed in amounts shown in Tables 1 to 3 below and stirred to prepare thermoplastic resin compositions. Also, the amounts of the above-described components were based on 100 parts by weight of the sum of the diene-based graft polymer, the first polymer, the second polymer, the third polymer, and the fourth polymer.

Experimental Example 1

Each thermoplastic resin composition of the examples and comparative examples was extruded to prepare a pellet. A physical property of the pellet was evaluated by the method described below, and results thereof are shown in Tables 1 to 3 below.

(1) Melt flow index (cm$^3$/10 min): measured under conditions of 220° C. and 10 kg/cm$^3$ in accordance with ISO 1133.

Experimental Example 2

The pellet prepared in Experimental Example 1 was injection-molded to prepare a sample. The physical properties of the sample were evaluated by the methods described below, and results thereof are shown in Tables 1 to 3.

(1) IZOD impact strength (kJ/m$^2$): measured under notched and 23° C. conditions in accordance with ISO 179.

(2) IZOD impact strength retention rate: IZOD impact strength is decreased by deterioration of polymers, which are components of the thermoplastic resin composition, when the product is repeatedly used. In order to reproduce the same levels of impact strength and deterioration as those of the recycled product immediately before final consumption, the thermoplastic resin composition was extruded 4 times to prepare a sample. Then, the IZOD impact strength of the sample prepared by 4-time extrusion was measured under notched and 23° C. conditions in accordance with ISO 179, and the measurement result was substituted into the following equation to calculate an IZOD impact strength retention rate.

IZOD impact strength retention rate=(IZOD impact strength of sample prepared by 4-time extrusion)/(IZOD impact strength measured in (1))

Good: 0.85 or more, Fair: 0.80 or more, and Poor: less than 0.80

(3) Tensile strength (MPa): measured under conditions of 50 mm/min and 23° C. in accordance with ISO 527.

(4) Heat deflection temperature (° C.): The tensile strength of the sample (thickness: 4 mm) was measured under 1.8 MPa and unannealed conditions in accordance with ISO 075.

(5) Parison sagging: determined by discharging a parison having a length of 500 mm and a weight of 500 g and measuring the time taken for the parison to sag.

Good: 60 seconds or more, Fair: 20 seconds or more and less than 60 seconds, and Poor: less than 20 seconds (6) Melt fracture: determined by measuring melt fracture at 220° C. using a capillary rheometer and measuring a shear rate at which melt fracture occurred.

Good: No occurrence of melt fracture

Fair: Occurrence of melt fracture at a rate of 251/s or more,

Poor: Occurrence of melt fracture at a rate of less than 251/s

TABLE 1

| Classification | Example 1 | Example 2 | Example 3 | Example 4 | Example 5 | Example 6 |
|---|---|---|---|---|---|---|
| Diene-based graft polymer (parts by weight) | 33.00 | 33.00 | 33.00 | 33.00 | 33.00 | 33.00 |
| First polymer (parts by weight) | 46.00 | 46.00 | 46.00 | 46.00 | 46.00 | 46.00 |
| Second polymer (parts by weight) | 0.50 | 0.50 | 0.50 | 0.05 | 1.50 | 5.00 |
| Third polymer (parts by weight) | 19.00 | 19.00 | 19.00 | 19.45 | 18.00 | 14.50 |
| Fourth polymer (parts by weight) | 1.50 | 1.50 | 1.50 | 1.50 | 1.50 | 1.50 |
| Fifth polymer (parts by weight) | 0.10 | 1.00 | 3.00 | 1.00 | 1.00 | 1.00 |
| Low-density polyethylene (parts by weight) | 0.00 | 0.00 | 0.00 | 0.00 | 0.00 | 0.00 |
| Polypropylene (parts by weight) | 0.00 | 0.00 | 0.00 | 0.00 | 0.00 | 0.00 |
| Antioxidant 1 (parts by weight) | 0.30 | 0.30 | 0.30 | 0.30 | 0.30 | 0.30 |
| Antioxidant 2 (parts by weight) | 0.30 | 0.30 | 0.30 | 0.30 | 0.30 | 0.30 |
| Lubricant 1 (parts by weight) | 0.20 | 0.20 | 0.20 | 0.20 | 0.20 | 0.20 |
| Lubricant 2 (parts by weight) | 0.30 | 0.30 | 0.30 | 0.30 | 0.30 | 0.30 |
| Melt flow index ($cm^3$/10 min) | 3.6 | 3.6 | 3.8 | 4.0 | 1.2 | 0.5 |
| IZOD impact strength ($kJ/m^2$) | 34 | 36 | 36 | 34 | 37 | 35 |
| IZOD impact strength retention rate | Fair | Good | Good | Fair | Good | Good |
| Tensile strength (MPa) | 39 | 38 | 37 | 39 | 38 | 37 |
| Heat deflection temperature (° C.) | 85 | 84 | 83 | 85 | 84 | 83 |
| Parison sagging | Good | Good | Fair | Good | Good | Good |
| Melt fracture | Good | Good | Good | Good | Good | Fair |

TABLE 2

| Classification | Example 7 | Example 8 | Comparative Example 1 | Comparative Example 2 | Comparative Example 3 |
|---|---|---|---|---|---|
| Diene-based graft polymer (parts by weight) | 33.00 | 33.00 | 33.00 | 33.00 | 33.00 |
| First polymer (parts by weight) | 46.00 | 46.00 | 46.00 | 46.00 | 46.00 |
| Second polymer (parts by weight) | 0.50 | 0.50 | 0.50 | 0.50 | 0.50 |
| Third polymer (parts by weight) | 20.00 | 13.50 | 19.00 | 19.00 | 19.00 |
| Fourth polymer (parts by weight) | 0.50 | 7.00 | 1.50 | 1.50 | 1.50 |
| Fifth polymer (parts by weight) | 1.00 | 1.00 | 0.00 | 0.05 | 3.30 |
| Low-density polyethylene (parts by weight) | 0.00 | 0.00 | 0.00 | 0.00 | 0.00 |
| Polypropylene (parts by weight) | 0.00 | 0.00 | 0.00 | 0.00 | 0.00 |
| Antioxidant 1 (parts by weight) | 0.30 | 0.30 | 0.30 | 0.30 | 0.30 |
| Antioxidant 2 (parts by weight) | 0.30 | 0.30 | 0.30 | 0.30 | 0.30 |
| Lubricant 1 (parts by weight) | 0.20 | 0.20 | 0.20 | 0.20 | 0.20 |
| Lubricant 2 (parts by weight) | 0.30 | 0.30 | 0.30 | 0.30 | 0.30 |
| Melt flow index ($cm^3$/10 min) | 4.5 | 0.8 | 3.7 | 3.6 | 3.8 |

TABLE 2-continued

| Classification | Example 7 | Example 8 | Comparative Example 1 | Comparative Example 2 | Comparative Example 3 |
|---|---|---|---|---|---|
| IZOD impact strength ($kJ/m^2$) | 36 | 34 | 34 | 34 | 36 |
| IZOD impact strength retention rate | Good | Fair | Poor | Poor | Good |
| Tensile strength (MPa) | 37 | 40 | 39 | 39 | 36 |
| Heat deflection temperature (° C.) | 84 | 85 | 85 | 85 | 83 |
| Parison sagging | Good | Good | Good | Good | Poor |
| Melt fracture | Fair | Fair | Fair | Fair | Good |

TABLE 3

| Classification | Comparative Example 4 | Comparative Example 5 | Comparative Example 6 | Comparative Example 7 | Comparative Example 8 |
|---|---|---|---|---|---|
| Diene-based graft polymer (parts by weight) | 33.00 | 33.00 | 33.00 | 33.00 | 33.00 |
| First polymer (parts by weight) | 46.00 | 46.00 | 46.00 | 46.00 | 46.00 |
| Second polymer (parts by weight) | 0.50 | 0.50 | 0.50 | 0.50 | 0.00 |
| Third polymer (parts by weight) | 19.00 | 19.00 | 19.00 | 20.50 | 14.50 |
| Fourth polymer (parts by weight) | 1.50 | 1.50 | 1.50 | 0.00 | 1.50 |
| Fifth polymer (parts by weight) | 4.00 | 0.00 | 0.00 | 1.00 | 1.00 |
| Low-density polyethylene (parts by weight) | 0.00 | 1.00 | 0.00 | 0.00 | 0.00 |
| Polypropylene (parts by weight) | 0.00 | 0.00 | 1.00 | 0.00 | 0.00 |
| Branched acrylonitrile/styrene polymer (parts by weight) | 0.00 | 0.00 | 0.00 | 0.00 | 5.00 |
| Antioxidant 1 (parts by weight) | 0.30 | 0.30 | 0.30 | 0.30 | 0.30 |
| Antioxidant 2 (parts by weight) | 0.30 | 0.30 | 0.30 | 0.30 | 0.30 |
| Lubricant 1 (parts by weight) | 0.20 | 0.20 | 0.20 | 0.20 | 0.20 |
| Lubricant 2 (parts by weight) | 0.30 | 0.30 | 0.30 | 0.30 | 0.30 |
| Melt flow index ($cm^3$/10 min) | 3.8 | 3.5 | 3.3 | 4.8 | 4.0 |
| IZOD impact strength ($kJ/m^2$) | 36 | 36 | 36 | 36 | 33 |
| IZOD impact strength retention rate | Good | Poor | Poor | Good | Poor |
| Tensile strength (MPa) | 36 | 38 | 39 | 37 | 40 |
| Heat deflection temperature (° C.) | 83 | 84 | 84 | 84 | 84 |
| Parison sagging | Poor | Good | Good | Good | Good |
| Melt fracture | Good | Good | Good | Poor | Good |

Referring to Tables 1 to 3, Examples 1 to 7 were excellent in impact resistance, impact resistance retention rate, tension resistance, and heat resistance, did not show a parison sagging phenomenon within a short period of time, and did also not show a melt fracture phenomenon. When Examples 1 to 3 were compared, the impact resistance and impact resistance retention rate of Example 1 comprising a small amount of a fifth polymer were slightly degraded, but the other physical properties were excellent as compared to Examples 2 and 3. Also, Example 3 comprising the largest amount of a fifth polymer showed a parison sagging phenomenon within a relatively short period of time, but equivalent levels of the other physical properties were exhibited as compared to Examples 1 and 2. When Examples 2 and 4 to 6 were compared, the impact resistance and impact resistance retention rate of Example 4 comprising the smallest amount of a second polymer were slightly degraded, but the other physical properties were excellent as compared to Examples 2, 5, and 6. Also, Example 6 comprising the largest amount of a second polymer showed a melt fracture phenomenon at a rate of 251/s or more unlike Examples 2, 4, and 5, but the other physical properties were excellent.

When Examples 2, 7, and 8 were compared, Example 2 comprising 1.50 parts by weight of a fourth polymer did not show a melt fracture phenomenon unlike Example 7 comprising 0.50 parts by weight of a fourth polymer and Example 8 comprising 7.00 parts by weight of a fourth polymer. From these experiment results, it can be seen that, when an appropriate amount of a fourth polymer is comprised, the best physical properties are realized.

Meanwhile, Comparative Example 1 not comprising a fifth polymer exhibited a poor impact resistance retention rate, and therefore, it can be seen that the recycling thereof is not possible. Also, it can be seen that, since recycling is not possible, the versatility of the thermoplastic resin composition is low.

In addition, Comparative Example 2 comprising a small amount of a fifth polymer exhibited a poor impact resistance retention rate, and therefore, it can be seen that the recycling thereof is not possible. Also, it can be seen that, since recycling is not possible, the versatility of the thermoplastic resin composition is low.

Comparative Examples 3 and 4 comprising excessive amounts of a fifth polymer showed a parison sagging phenomenon within a short period of time, and therefore, it can be seen that they are not suitable for a tail light housing.

Comparative Example 5 comprising low-density polyethylene instead of a fifth polymer and Comparative Example 6 comprising polypropylene exhibited poor impact resistance retention rates, and therefore, it can be seen that the recycling thereof is not possible. Also, it can be seen that, since recycling is not possible, the versatility of the thermoplastic resin composition is low.

Comparative Example 7 not comprising a fourth polymer showed a melt fracture phenomenon at a rate of less than 251/s, and therefore, it can be seen that it is not suitable for a tail light housing.

Comparative Example 8 not comprising a second polymer exhibited a poor impact resistance retention rate, and therefore, it can be seen that the recycling thereof is not possible. Also, it can be seen that, since recycling is not possible, the versatility of the thermoplastic resin composition is low.

The invention claimed is:

1. A thermoplastic resin composition comprising:

a diene-based graft polymer;

a first polymer comprising a vinyl cyanide-based monomer unit and an alkyl-substituted styrene-based monomer unit;

a second polymer comprising a vinyl cyanide-based monomer unit, an aromatic vinyl-based monomer unit, and a (meth)acrylate-based monomer unit, wherein the (meth)acrylate-based monomer unit is represented by Chemical Formula 1 below <Chemical Formula 1>

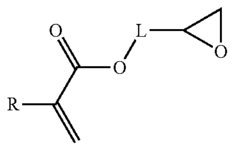

wherein in the Chemical Formula 1, R represents a hydrogen or a $C_1$ to $C_{10}$ alkyl group and L represents a $C_1$ to $C_{10}$ alkylene group;

a third polymer comprising a vinyl cyanide-based monomer unit and an alkyl-unsubstituted styrene-based monomer unit, wherein the third polymer comprises a weight-average molecular weight of 80,000 to 220,000 g/mol;

a fourth polymer comprising a vinyl cyanide-based monomer unit and an alkyl-unsubstituted styrene-based monomer unit, wherein the fourth polymer comprises a weight-average molecular weight of 1,500,000 to 5,000,000 g/mol; and a fifth polymer comprising an olefin-based monomer unit, wherein the fifth polymer comprises a density of 970 to 1,000 $kg/m^3$ measured in accordance with ASTM D1505, wherein the fifth polymer is comprised in an amount of 0.10 to 3.00 parts by weight with respect to 100 parts by weight of the sum of the diene-based graft polymer, the first polymer, the second polymer, the third polymer, and the fourth polymer.

2. The thermoplastic resin composition of claim 1, wherein the fifth polymer comprises a weight-average molecular weight of 500 to 5,500 g/mol.

3. The thermoplastic resin composition of claim 1, wherein the fifth polymer comprises a softening point of 130 to 140° C. measured in accordance with ASTM D1525.

4. The thermoplastic resin composition of claim 1, wherein the diene-based graft polymer comprises an aromatic vinyl-based monomer unit and a vinyl cyanide-based monomer unit are grafted to the diene-based rubber polymer.

5. The thermoplastic resin composition of claim 1, wherein the diene-based graft polymer is comprised in an amount of 23.00 to 43.00 parts by weight with respect to 100 parts by weight of the sum of the diene-based graft polymer, the first polymer, the second polymer, the third polymer, and the fourth polymer.

6. The thermoplastic resin composition of claim 1, wherein the first polymer further comprises an alkyl-unsubstituted styrene-based monomer unit.

7. The thermoplastic resin composition of claim 1, wherein the first polymer comprises one or more selected from the group consisting of an acrylonitrile/α-methyl styrene polymer and an acrylonitrile/styrene/a-methyl styrene polymer.

8. The thermoplastic resin composition of claim 1, wherein the first polymer is comprised in an amount of 36.00 to 56.00 parts by weight with respect to 100 parts by weight of the sum of the diene-based graft polymer, the first polymer, the second polymer, the third polymer, and the fourth polymer.

9. The thermoplastic resin composition of claim 1, wherein the second polymer comprises an acrylonitrile/styrene/glycidyl methacrylate polymer.

10. The thermoplastic resin composition of claim 1, wherein the second polymer is comprised in an amount of 0.05 to 7.00 parts by weight with respect to 100 parts by weight of the sum of the diene-based graft polymer, the first polymer, the second polymer, the third polymer, and the fourth polymer.

11. The thermoplastic resin composition of claim 1, wherein the third polymer is comprised in an amount of 9.00 to 29.00 parts by weight with respect to 100 parts by weight of the sum of the diene-based graft polymer, the first polymer, the second polymer, the third polymer, and the fourth polymer.

12. The thermoplastic resin composition of claim 1, wherein the fourth polymer is comprised in an amount of 0.10 to 9.00 parts by weight with respect to 100 parts by weight of the sum of the diene-based graft polymer, the first polymer, the second polymer, the third polymer, and the fourth polymer.

* * * * *